United States Patent
Pitsch et al.

(10) Patent No.: US 11,193,553 B2
(45) Date of Patent: Dec. 7, 2021

(54) VIBRATION DAMPER FOR VEHICLES, A PISTON ROD, A PISTON ROD ATTACHMENT AND A METHOD FOR FIXING AN ATTACHMENT ELEMENT ON A PISTON ROD OF A VIBRATION DAMPER, IN PARTICULAR FOR VEHICLES

(71) Applicants: ThyssenKrupp Bilstein GmbH, Ennepetal (DE); thyssenkrupp AG, Essen (DE)

(72) Inventors: Daniel Pitsch, Cologne (DE); Martin Flick, Gummersbach (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/107,565

(22) Filed: Aug. 21, 2018

(65) Prior Publication Data
US 2019/0063540 A1    Feb. 28, 2019

(30) Foreign Application Priority Data

Aug. 25, 2017 (DE) .................... 10 2017 214 922.1
Aug. 25, 2017 (DE) .................... 10 2017 214 924.8

(51) Int. Cl.
*F16F 9/54*    (2006.01)
*F16F 9/10*    (2006.01)
(Continued)

(52) U.S. Cl.
CPC ............... *F16F 9/103* (2013.01); *F16F 9/19* (2013.01); *F16F 9/3228* (2013.01);
(Continued)

(58) Field of Classification Search
CPC .......... F16J 1/12; F16F 9/3221; F16F 9/3207; F16F 9/3271; F16F 9/54; F01L 3/10
See application file for complete search history.

(56) References Cited

U.S. PATENT DOCUMENTS 941,314 A * 11/1909 Evans ........................ F01L 3/10
                                                    123/90.67
1,307,502 A    6/1919 Knudson
(Continued)

FOREIGN PATENT DOCUMENTS

CN    101029668 A    9/2007
CN    204344794 U    5/2015
(Continued)

*Primary Examiner* — Robert A. Siconolfi
*Assistant Examiner* — Stephen M Bowes
(74) *Attorney, Agent, or Firm* — thyssenkrupp North America, LLC

(57) ABSTRACT

A vibration damper may comprise a damper tube filled at least partially with damping liquid. A piston rod is movable to and fro in the damper tube, and a working piston is movable with the piston rod. The working piston may divide an interior space of the damper tube into a piston rod-side working space and a working space distal the piston rod. A piston rod attachment may include an attachment element, a bracing element, and a wedge element. On a side that faces away from the working piston, the piston rod may have a wedge element cut-out for partially receiving the wedge element in a braced state. The attachment element may be connected to the bracing element such that the attachment element braces the bracing element with respect to the piston rod via the wedge element arranged in the wedge element cut-out.

6 Claims, 1 Drawing Sheet

(51) Int. Cl.
*F16F 9/32* (2006.01)
*F16F 9/19* (2006.01)

(52) U.S. Cl.
CPC ........ *F16F 9/3235* (2013.01); *F16F 2222/12* (2013.01); *F16F 2226/04* (2013.01); *F16F 2232/08* (2013.01)

(56) References Cited

U.S. PATENT DOCUMENTS

| | | | | |
|---|---|---|---|---|
| 2,759,466 | A * | 8/1956 | Heimbuch | F01L 3/10 123/90.37 |
| 3,466,009 | A * | 9/1969 | Giles | F01L 3/10 251/337 |
| 3,807,285 | A | 4/1974 | Phillips | |
| 4,428,464 | A * | 1/1984 | Miura | F16F 9/3242 137/543.19 |
| 4,431,092 | A * | 2/1984 | Kloster | B60G 13/001 188/321.11 |
| 4,438,908 | A * | 3/1984 | Terada | B60G 15/062 188/321.11 |
| 4,791,712 | A | 12/1988 | Wells | |
| 4,815,360 | A | 3/1989 | Winterle | |
| 4,958,706 | A | 9/1990 | Richardson | |
| 5,213,072 | A | 5/1993 | Dohring | |
| 5,515,821 | A * | 5/1996 | Wolck, Jr. | F01L 1/46 123/188.6 |
| 5,730,262 | A * | 3/1998 | Rucks | F16F 9/58 188/321.11 |
| 6,446,541 | B1 * | 9/2002 | Eriksson | F16D 1/05 403/367 |
| 2003/0019453 | A1 * | 1/2003 | Schlembach | F01L 1/32 123/90.52 |
| 2003/0029410 | A1 * | 2/2003 | Gaessler | F01L 3/10 123/188.3 |
| 2011/0146604 | A1 * | 6/2011 | Sai | F16F 1/32 123/90.66 |
| 2011/0290605 | A1 | 12/2011 | Krawczyk | |
| 2019/0063540 | A1 | 2/2019 | Pitsch | |

FOREIGN PATENT DOCUMENTS

| | | | | |
|---|---|---|---|---|
| CN | 105822712 | A | 8/2016 | |
| DE | 1004436 | B | 3/1957 | |
| DE | 10010272 | A1 * | 9/2001 | ............... F01L 3/10 |
| DE | 10138322 | A | 3/2003 | |
| DE | 102005058555 | B | 6/2007 | |
| JP | S5715136 | A | 1/1982 | |

\* cited by examiner

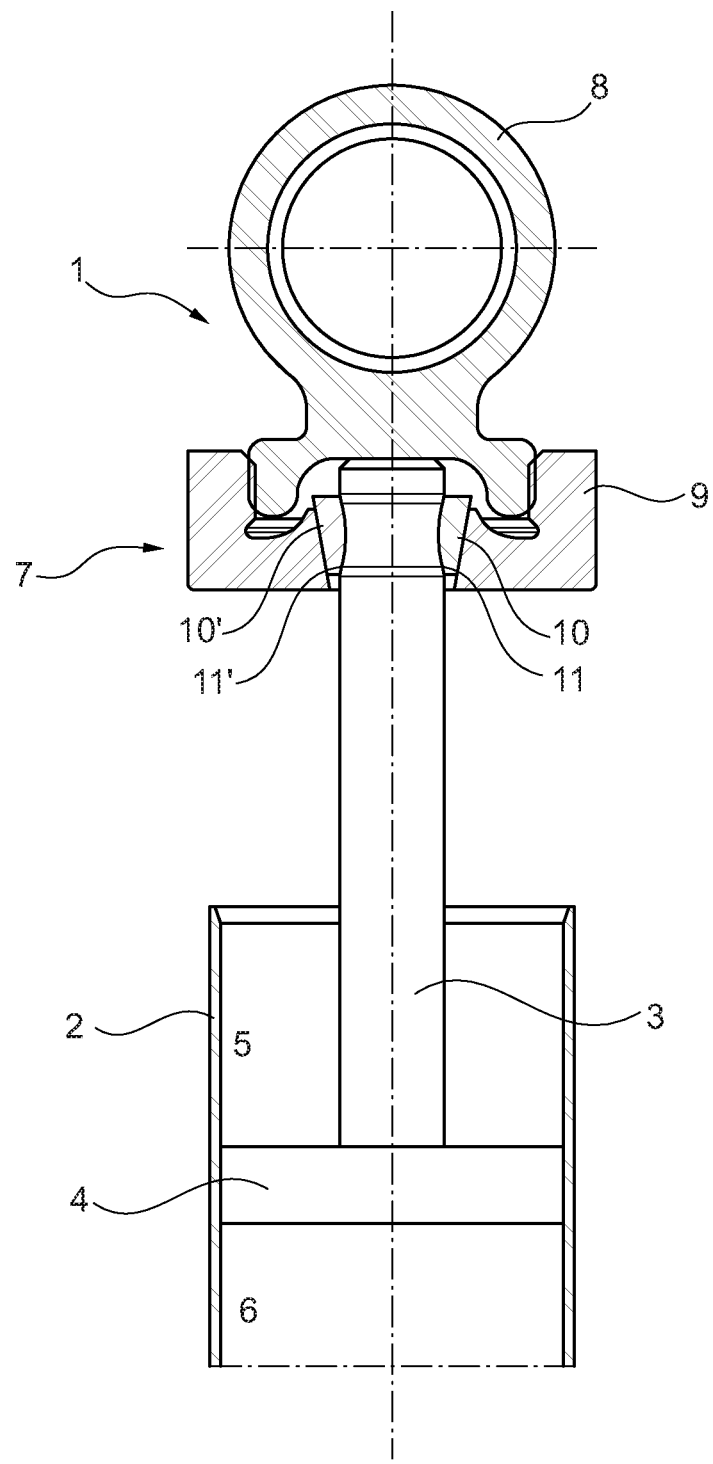

VIBRATION DAMPER FOR VEHICLES, A PISTON ROD, A PISTON ROD ATTACHMENT AND A METHOD FOR FIXING AN ATTACHMENT ELEMENT ON A PISTON ROD OF A VIBRATION DAMPER, IN PARTICULAR FOR VEHICLES

CROSS-REFERENCE TO RELATED APPLICATIONS

This application is a non-provisional application claiming priority to German Patent Application No. DE 10 2017 214 922.1, which was filed Aug. 25, 2017, and to German Patent Application No. DE 10 2017 214 924.8, which was filed Aug. 25, 2017, the entire contents of both of which are hereby incorporated by reference herein.

FIELD

The present disclosure generally relates to vibration dampers and methods for fixing attachment elements on piston rods of vibration dampers.

BACKGROUND

A variety of vibration dampers are known in the prior art. For example, German Patent No. DE 101 38 322 A1 discloses a vibration damper having an attachment element that is attached to a piston rod via a threaded connection.

It is a problem in the case of the embodiments which are known in the prior art that weight and material savings on the piston rod component are not possible or are only possible to a very limited extent on account of the required strength and continuous loading properties. In particular, high component weights are associated with lower vibration damper performance and higher costs, such as material and/or machining costs.

Thus a need exists for improved vibration dampers for vehicles, piston rods, and piston rod attachments that avoid the above-mentioned disadvantages. In particular, improved piston rods and improved piston rod attachments are needed by way of improved vibration dampers, which improved piston rod arrangement, in the case of identical or improved strength and continuous loading properties, makes an attachment possible that is secure and as stress-free as possible to an attachment element in the case of identical or lower component weights and improved damper performance. Furthermore, a simple, more secure method with reduced errors for fixing an attachment element on a piston rod of a vibration damper for vehicles is needed. In addition, methods with low manufacturing costs are to be provided.

BRIEF DESCRIPTION OF THE FIGURE

FIG. 1 is a longitudinal sectional diagram of an example vibration damper in a braced state in a region of an example piston rod attachment.

DETAILED DESCRIPTION

Although certain example methods and apparatuses have been described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns vibration dampers for vehicles. In some examples, a vibration damper may comprise a damper tube which is filled at least partially with damping liquid, it being possible for a piston rod to be moved to and fro in the damper tube, it being possible for a working piston to also be moved with the piston rod, by way of which working piston the interior space of the damper tube is divided into a piston rod-side working space and a working space which is remote from the piston rod. The vibration damper may also include a piston rod attachment, the piston rod attachment having an attachment element, a bracing element, and at least one wedge element, and, on the side which faces away from the working piston, the piston rod having at least one wedge element cut-out for partially receiving the at least one wedge element, the at least one wedge element being arranged in the at least one wedge element cut-out in a braced state, and the attachment element being connected to the bracing element in such a way that the attachment element braces the bracing element with respect to the piston rod via the at least one wedge element which is arranged in the at least one wedge element cut-out.

The present disclosure also generally concerns piston rods for vibration dampers. In some examples, the piston rod may have at least one wedge element cut-out for partially receiving the at least one wedge element.

The present disclosure also generally concerns piston rod attachments for vibration dampers.

In some examples, a method for fixing an attachment element on a piston rod of a vibration damper may comprise the following steps:

a. provision of at least one wedge element,
b. provision of at least one attachment element,
c. provision of a piston rod, the piston rod having, on the side for attaching the attachment element which is provided in step b), at least one wedge element cut-out for partially receiving the at least one wedge element which is provided in step a),
d. provision of a bracing element, the bracing element having at least one passage opening for guiding through the piston rod which is provided in step c),
e. introduction of the piston rod which is provided in step c) through the passage opening of the bracing element which is provided in step d), and arrangement of the bracing element on that side of the at least one wedge element cut-out of the introduced piston rod which faces away from the piston rod end, the bracing element being arranged in such a way that the bracing element does not cover the wedge element cut-out,
f. arrangement of the at least one wedge element which is provided in step a) in the at least one wedge element cut-out of the piston rod which is introduced in step e),
g. arrangement of the at least one attachment element which is provided in step b) on that side of the at least one wedge element cut-out of the piston rod which is introduced in step e), which side faces the piston rod end, and h. bracing of the attachment element which is arranged in step g) by way of the bracing element which is arranged in step e) with respect to the piston rod which is introduced in step e), via the at least one wedge element which is arranged in step f) in the at least one wedge element cut-out of the piston rod which is introduced in step e).

Some aspects of the present disclosure can be implemented in a vibration damper for vehicles, in a piston rod, in a piston rod attachment, and in a method for fixing an attachment element on a piston rod of a vibration damper for vehicles.

In comparison with conventional vibration dampers, the vibration damper according to the present disclosure has the advantage of lower component weights, in particular of the piston rod weight in the case of identical or improved strength and continuous loading properties. In addition, a secure attachment which is as free from stress as possible to an attachment element is made possible in the case of identical or lower component weights. Furthermore, in the case of overloading of the piston rod according to the disclosure, the latter is more inclined to bend than to break. In addition, a reduced piston rod diameter is associated with less friction on account of a smaller contact area. Furthermore, the manufacturing costs of the piston rods are lower.

In comparison with conventional piston rods, the piston rod according to the disclosure has the advantage of a lower piston rod weight in the case of identical or improved strength and continuous loading properties. Furthermore, the manufacturing costs of the piston rods are lower.

In comparison with conventional piston rod attachments, the piston rod attachment according to the disclosure has the advantage of a more homogeneous stress distribution in the component in the case of identical or improved strength and continuous loading properties.

The method according to the disclosure for fixing an attachment element on a piston rod of a vibration damper, in particular for vehicles, has the advantage of a simple, more secure method with reduced errors in comparison with conventional methods.

Within the context of the present disclosure, braced is understood to mean an at least non-positive connection which is, in particular, fastening of an attachment element, in particular an attachment eye, to a piston rod, which fastening can be released again and/or is adjustable. The connection is by way of example also configured as a positive connection.

In accordance with another example, the piston rod attachment fixes the attachment element on the piston rod at least axially in the piston rod longitudinal direction. On the side which faces away from the vibration damper, the attachment element serves for the wheel-side or vehicle body-side attachment of the vibration damper to a vehicle. The attachment element is selected, for example, from a group comprising an attachment eye, an attachment fork, an attachment head, an attachment stud, an attachment pin, in particular an attachment cross pin, an attachment joint pin, or a combination thereof.

In some examples, the at least one wedge element cut-out for receiving the at least one wedge element configures a fit in the braced state with the at least one wedge element.

Within the context of the present disclosure, a fit is understood to at least mean a transition fit, in particular an interference fit. For example, two wedge elements are used.

In accordance with some examples, the at least one wedge element cut-out for receiving the at least one wedge element and that side of the at least one wedge element which is to be received in the at least one wedge element cut-out have at least one geometrically concave shape. For example, the wedge element cut-out is configured as a circumferential groove in the circumferential direction on the piston rod.

In accordance with still another example, on the side which faces the piston rod, the at least one wedge element has at least one geometrically convex shape for receiving in the at least one concave shape of the wedge element cut-out.

In one example, the at least one wedge element is configured as a geometric hollow cone shaped segment and the at least one bracing element is configured as a geometric funnel shape, the geometric hollow cone shaped segment of the at least one wedge element being arranged in the geometric funnel shape of the bracing element in the braced state and being configured as a clamping fit.

In some examples, the at least one wedge element is selected from a group comprising a collet, a wedge, a clamping bush, a clamping jaw, a chuck, a clamping sleeve, a half shell or a combination thereof.

In some examples, the at least one bracing element is selected from a group comprising a collet nut, a threaded nut, in particular an external threaded nut, a shim with a thread, in particular a shim with an external thread, a counter washer, a jam nut, a lock nut or a combination thereof.

In one example, the attachment element has a supporting face, the attachment element being supported via the supporting face in the braced state at least partially with respect to the end face of that side of the piston rod which faces away from the working piston.

In some examples, the sequence of steps a) to d) is arbitrary.

With reference now to the drawing, FIG. 1 is a longitudinal section along a longitudinal axis L (illustrated using alternating short/long/short/long dashes) of a vibration damper 1 in the region of a piston rod attachment 7 with a damper tube 2, a piston rod 3 and an attachment element 8 which is arranged on the piston rod 3 outside the damper tube 2, and a working piston 4 which is arranged within the damper tube 2, in accordance with some examples of the disclosure. In the present example, the attachment element 8 is shown by way of example using short dashes as an attachment eye, in order to clarify the possible variations of attachment elements. The working piston 4 divides the interior space of the damper tube 2 into a piston rod-side working space 5 and a working space 6 which is remote from the piston rod. At the end which is remote from the working piston, the piston rod 3 has at least one wedge element cut-out (shown as two wedge element cut-outs 11, 11') for partially receiving at least one wedge element (shown as two wedge elements 10, 10'). The piston rod attachment 7 comprises the attachment element 8, a bracing element 9, the wedge elements 10, 10', and the wedge element cut-outs 11, 11'. In the braced state which is shown, the wedge elements 10, 10' are arranged in the wedge element cut-outs 11, 11', and the bracing element 9 is connected to the attachment element 8 in such a way that the bracing element 9 braces the attachment element 8 with respect to the piston rod 3 via the wedge elements 10, 10' which are arranged in the wedge element cut-outs 11, 11'. In the example shown, for bracing purposes, the attachment element 8 which has an external thread is screwed into a matching bracing element 9 with an internal thread, into the internal thread which matches the external thread, the attachment element 8 being braced more fixedly with respect to the piston rod 3 as the screwing action increases, via the wedge action between the geometrical funnel shape which is shown of the bracing element 9 and the wedge elements 10, 10' which are arranged in the wedge element cut-outs 11, 11'.

Vibration dampers for vehicles, piston rods, attachment elements and methods for fixing an attachment element on a piston rod of a vibration damper for vehicles of the above-described type are used in the production of vehicles, in particular of chassis of motor vehicles, of motorcycles, of bicycles, of snowmobiles, and of electric vehicles.

LIST OF REFERENCE SIGNS

1=Vibration damper
2=Damper tube
3=Piston rod
4=Working piston
5=Piston rod-side working space
6=Working space which is remote from the piston rod
7=Piston rod attachment
8=Attachment element
9=Bracing element
10, 10'=Wedge element/elements
11, 11'=Wedge element cut-out/cut-outs
L=Longitudinal axis of the vibration damper

What is claimed is:

1. A vibration damper comprising:
a damper tube filled at least partially with damping liquid, wherein a piston rod that extends along a longitudinal axis is movable to and fro in the damper tube, wherein a working piston is movable with the piston rod, the working piston dividing an interior space of the damper tube into a first working space through which the piston rod extends and a second working space through which the piston rod does not extend; and
a piston rod attachment comprising an attachment element, a bracing element, and a wedge element, wherein a side of the piston rod that faces away from the working piston includes a wedge element cut-out for partially receiving the wedge element, wherein a singular, integral portion of the piston rod extends into and through the wedge element, wherein the attachment element is connected to the bracing element such that the bracing element braces the attachment element with respect to the piston rod via the wedge element that is disposed in the wedge element cut-out in a braced state, wherein the bracing element engages the wedge element along a majority of a longitudinal extent of the wedge element, wherein the longitudinal axis is normal to a plane in which a rim of the attachment element surrounds the piston rod and in which the bracing element surrounds the rim of the attachment element, wherein the attachment element comprises a supporting face disposed at and intersecting the longitudinal axis, the attachment element being supported via the supporting face in the braced state at least partially with respect to an end face of the side of the piston rod that faces away from the working piston.

2. The vibration damper of claim 1 wherein both longitudinal end surfaces of the wedge element are unobstructed and are not in contact with the attachment element or the bracing element.

3. The vibration damper of claim 1 wherein a radially-outer diameter of the bracing element is constant for a longitudinal extent of the bracing element where the bracing element contacts the wedge element.

4. The vibration damper of claim 1 wherein a portion of the bracing element that is longitudinally-closest to the working piston is longitudinally closer to the working piston than a portion of the attachment element that is longitudinally-closest to the working piston.

5. A vibration damper comprising:
a damper tube filled at least partially with damping liquid, wherein a piston rod that extends along a longitudinal axis is movable to and fro in the damper tube, wherein a working piston is movable with the piston rod, the working piston dividing an interior space of the damper tube into a first working space through which the piston rod extends and a second working space through which the piston rod does not extend; and
a piston rod attachment comprising an attachment element, a bracing element, and a wedge element, wherein a side of the piston rod that faces away from the working piston includes a wedge element cut-out for partially receiving the wedge element, wherein a singular, integral portion of the piston rod extends into and through the wedge element, wherein the attachment element is connected to the bracing element such that the bracing element braces the attachment element with respect to the piston rod via the wedge element that is disposed in the wedge element cut-out in a braced state, wherein the bracing element engages the wedge element along a majority of a longitudinal extent of the wedge element, wherein the longitudinal axis is normal to a plane in which a rim of the attachment element surrounds the piston rod and in which the bracing element surrounds the rim of the attachment element, wherein the attachment element is only indirectly coupled to the piston rod, the attachment element having a supporting face that is orthogonal to the longitudinal axis and is in direct contact with the piston rod.

6. A vibration damper comprising:
a damper tube filled at least partially with damping liquid, wherein a piston rod that extends along a longitudinal axis is movable to and fro in the damper tube, wherein a working piston is movable with the piston rod, the working piston dividing an interior space of the damper tube into a first working space through which the piston rod extends and a second working space through which the piston rod does not extend; and
a piston rod attachment comprising an attachment element, a bracing element, and a wedge element, wherein a side of the piston rod that faces away from the working piston includes a wedge element cut-out for partially receiving the wedge element, wherein a singular, integral portion of the piston rod extends into and through the wedge element, wherein the attachment element is connected to the bracing element such that the bracing element braces the attachment element with respect to the piston rod via the wedge element that is disposed in the wedge element cut-out in a braced state, wherein the bracing element engages the wedge element along a majority of a longitudinal extent of the wedge element, wherein the longitudinal axis is normal to a plane in which a rim of the attachment element surrounds the piston rod and in which the bracing element surrounds the rim of the attachment element, wherein the attachment element is a single-piece, integral construction, wherein the bracing element has a circular recess for receiving the rim of the attachment element.

* * * * *